(12) United States Patent     (10) Patent No.:   US 12,602,163 B2

Coppola                   (45) Date of Patent:     Apr. 14, 2026

(54) MANAGING CROSS-TEMPERATURE EXPOSURE IN MEMORY SYSTEMS

(71) Applicant: Micron Technology, Inc., Boise, ID (US)

(72) Inventor: Gianluca Coppola, Liveri (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/781,803

(22) Filed: Jul. 23, 2024

(65) Prior Publication Data

US 2025/0284398 A1     Sep. 11, 2025

Related U.S. Application Data

(60) Provisional application No. 63/562,127, filed on Mar. 6, 2024.

(51) Int. Cl.
*G06F 12/00*       (2006.01)
*G06F 3/06*        (2006.01)

(52) U.S. Cl.
CPC .......... *G06F 3/0611* (2013.01); *G06F 3/0653* (2013.01); *G06F 3/0659* (2013.01); *G06F 3/0679* (2013.01)

(58) Field of Classification Search
CPC ..... G06F 3/0625; G06F 3/0659; G06F 3/0673
USPC .......................................................... 711/154
See application file for complete search history.

(56) References Cited

U.S. PATENT DOCUMENTS

| | | | | |
|---|---|---|---|---|
| 11,210,031 B1 * | 12/2021 | Mekhanik | ............. | G06F 3/0679 |
| 11,636,033 B2 * | 4/2023 | Gorobets | ............. | G06F 3/0613 |
| | | | | 711/103 |
| 2020/0110536 A1 * | 4/2020 | Navon | ................. | G06F 3/0616 |

* cited by examiner

*Primary Examiner* — Mohamed M Gebril

(74) *Attorney, Agent, or Firm* — Holland & Hart LLP

(57)         ABSTRACT

Methods, systems, and devices for techniques for managing cross-temperature exposure in memory systems are described. A memory system controller may identify, during a boot sequence, a temperature associated with a write operation at a logical block address (LBA) of a first memory device, where the LBA is associated with a physical address of the first memory device that stores a portion of boot sequence data. The memory system controller may select a read setting based on a difference between an operating temperature of the first memory device during the boot sequence and the temperature associated with the write operation at the LBA of the first memory device. Accordingly, the memory system controller may perform a read operation to read the portion of the boot sequence data from the physical address associated with the LBA according to the read setting.

23 Claims, 7 Drawing Sheets

205 — Receive One or More Commands

210 — Store LBAs in Table

215 — Receive Indication to Set a Register to a First Value

220 — Identify Write Temperature For Each LBA

225 — Receive Indication to Start a Power Off Sequence

230 — Update Table with Write Temperatures for each LBA

235 — Enter Idle State

200

305 — Identify Operating Temperature

310 — Load Table into Volatile Memory

315 — Identify Write Temperatures for each LBA from Table

320 — Select Read Settings for each LBA

325 — Read Boot Sequence Data According to Selected Read Settings

330 — Transmit Boot Sequence Data to Host

300

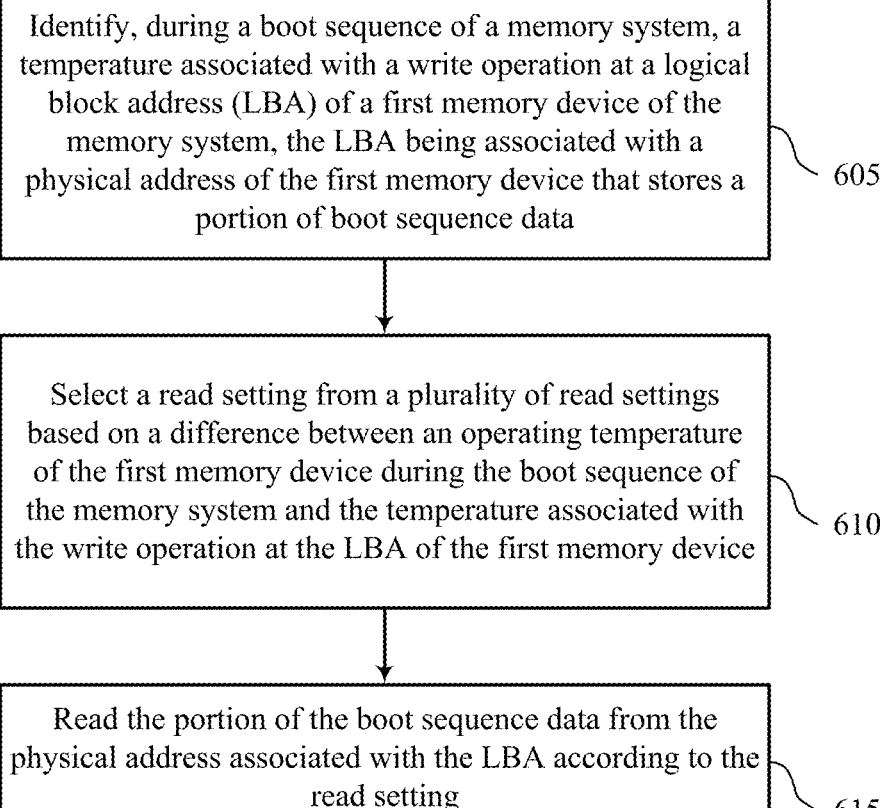

Identify, during a boot sequence of a memory system, a temperature associated with a write operation at a logical block address (LBA) of a first memory device of the memory system, the LBA being associated with a physical address of the first memory device that stores a portion of boot sequence data

605

Select a read setting from a plurality of read settings based on a difference between an operating temperature of the first memory device during the boot sequence of the memory system and the temperature associated with the write operation at the LBA of the first memory device

610

Read the portion of the boot sequence data from the physical address associated with the LBA according to the read setting

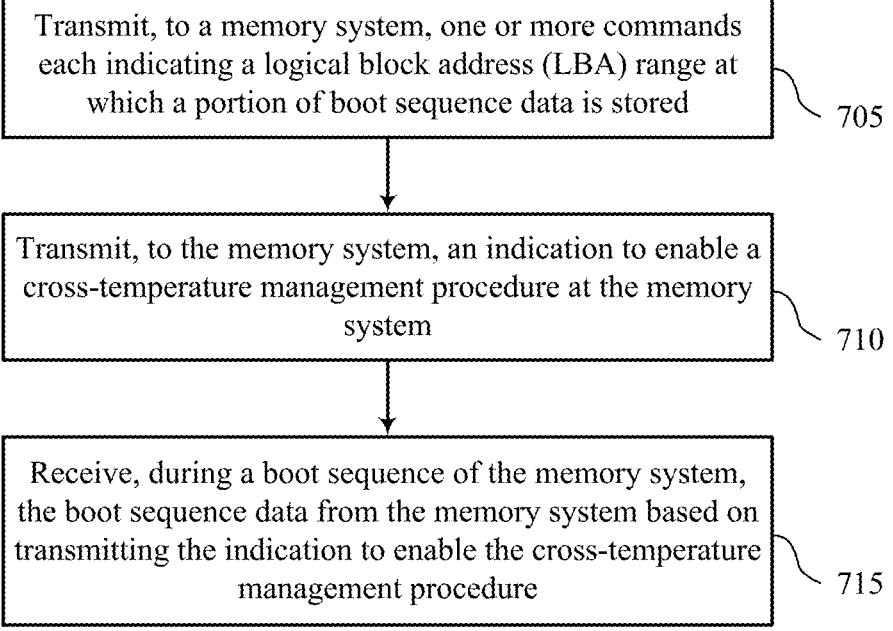

Transmit, to a memory system, one or more commands each indicating a logical block address (LBA) range at which a portion of boot sequence data is stored

705

Transmit, to the memory system, an indication to enable a cross-temperature management procedure at the memory system

710

Receive, during a boot sequence of the memory system, the boot sequence data from the memory system based on transmitting the indication to enable the cross-temperature management procedure

MANAGING CROSS-TEMPERATURE EXPOSURE IN MEMORY SYSTEMS

CROSS REFERENCE

The present application for patent claims priority to U.S. Patent Application No. 63/562,127 by Gianluca Coppola, entitled "MANAGING CROSS-TEMPERATURE EXPOSURE IN MEMORY SYSTEMS," filed Mar. 6, 2024, which is assigned to the assignee hereof, and which is expressly incorporated by reference in its entirety herein.

TECHNICAL FIELD

The following relates to one or more systems for memory, including techniques for managing cross-temperature exposure in memory systems.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 6 and 7 show flowcharts illustrating a method or methods that support techniques for managing cross-temperature exposure in memory systems in accordance with examples as disclosed herein.

DETAILED DESCRIPTION

Figure 1:
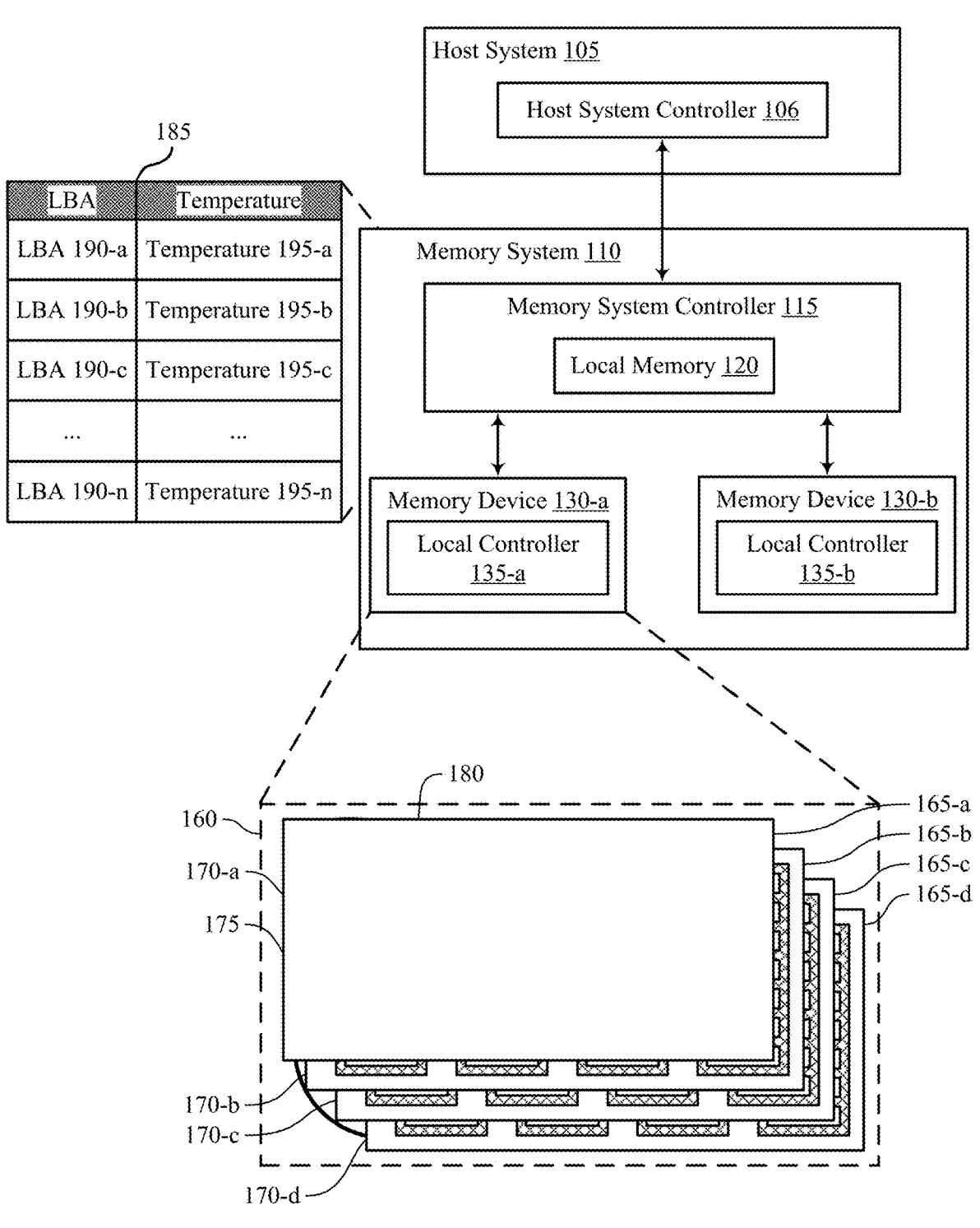
FIG. 1 shows an example of a system that supports techniques for managing cross-temperature exposure in memory systems in accordance with examples as disclosed herein.

Some memory systems (e.g., not-and (NAND) systems) may experience cross-temperature exposure during access operations (e.g., read and write operations), which may reduce the likelihood of correctly reading data during read operations, introduce latency into such access operations, or both. For example, one or more memory system controllers of a memory system may write data to one or more memory cells while the memory system is operating at a relatively extreme temperature (e.g., a relatively high temperature, a relatively low temperature). In such examples, if the data is read while the memory system is operating at markedly different temperature from the relatively extreme temperature (e.g., a relatively low temperature, a relatively high temperature), the one or more memory system controllers may be required to apply multiple read operations, each with various reference voltage levels, in order to correctly read the data. That is, if the difference (e.g., range) between a write temperature of the data (e.g., a temperature of the memory system during a write operation) and the read temperature of the data (e.g., a temperature of the memory system during a read operation) satisfies a threshold, the memory system may experience cross-temperature exposure for such data. In some cases, during a boot sequence (e.g., a procedure during which the memory system is powered on and one or more host applications are starting), the one or more memory system controllers may attempt to read boot sequence data (e.g., data corresponding to boot sequences at the one or more host applications) from one or more memory devices, where such boot sequence data may be affected by cross-temperature exposure. As such, the one or more memory system controllers may be required to apply multiple read operations to correctly obtain the boot sequence data, which may increase the latency of the boot sequence, resulting in timeouts of the host applications, among other issues.

In accordance with the techniques described herein, the memory system may maintain information (e.g., in a table), where the information (e.g., each entry in the table) provides an association between a logical block address (LBA) corresponding to a physical address that stores a portion of the boot sequence data and a temperature at which the portion of boot sequence data was written, which may also be referred herein as a write temperature. Accordingly, during the boot sequence, one or more memory system controllers may identify an operating temperature of the memory system and identify, from the information (e.g., table), respective write temperatures for each portion of the boot sequence data. Based on identifying the operating temperature and the respective write temperatures for each portion of the boot sequence data, the one or more memory system controllers may select a respective read setting (e.g., a reference voltage, trim setting) to read each portion of the boot sequence data according to (e.g., based on, in response to) a difference between the operating temperature of the memory system and the respective write temperatures. In this way, according to the selected read settings, the memory system may perform a single read operation (as opposed to multiple read operations in other different systems and techniques) at each physical address associated with the LBAs listed in the table to obtain the boot sequence data, thereby reducing latency during the boot sequence, among other advantages.

In addition to applicability in memory systems as described herein, techniques for managing cross-temperature exposure in memory systems may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing the quantity of read operations at the memory system during a boot sequence of the memory system, which may decrease processing or latency times, improve response times, or otherwise improve user experience, among other benefits.

Features of the disclosure are illustrated and described in the context of systems, devices, and circuits. Features of the disclosure are further illustrated and described in the context of process flows and flowcharts.

FIG. 1 shows an example of a system 100 that supports techniques for managing cross-temperature exposure in memory systems in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for managing cross-temperature exposure in memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The host system 105 may operate one or more applications (e.g., user programs), where such applications may have relatively strict system boot sequence times (e.g., short boot up times). Accordingly, during a boot sequence of the system 100, if the application does not boot properly (e.g., load or start) within a threshold duration (e.g., a timeout range), the application may experience a timeout, leading to failures with loading the application at the host system 105. For example, during the boot sequence, the host system 105 may request, from the memory system 110, boot sequence data associated with a first application, where the memory system controller 115 may read the boot sequence data from the memory devices 130 and transmit the boot sequence data to the host system 105, thereby enabling the host system 105 to boot the first application. As described herein, boot sequence data may be data associated with a boot sequence of an application operated by the host system 105, for example, data associated with a logo of a boot sequence of the host application, data associated with a description displayed at the host system 105 during the boot sequence of the application, or the like.

In some cases, the system 100 may experience an increased latency in the boot sequence due to cross-temperature exposure, which may lead to timeouts for the applications at the host system 105, among other challenges. For example, the memory system 110 may experience cross-temperature exposure when data that is written at relatively high temperature (or low temperature) is subsequently read at relatively low temperature (or high temperature), which may cause the host system controller 106, the memory system controller 115, or the local controllers 135 to incorrectly read the data. That is, the memory system 110 may experience cross-temperature exposure during a read operation if the difference between write temperature of the data and the read temperature of the data satisfies a threshold range.

The threshold ranges between the write temperature of the data and the read temperature of the data may vary for different types of the memory cells of the pages 175 (e.g., SLCs, TLCS, MLCs, among other types). Further, the threshold range may vary according to an endurance of the memory system 110, a data retention metric of the memory system 110, or both. As illustrative examples, the threshold range between the write temperature of the data and the read temperature of the data may be 10 degrees Celsius, 20 degrees Celsius, 50 degrees Celsius, or 100 degrees Celsius, etc. Accordingly, if the difference between the read temperature of the data and the write temperature of the data is above the threshold range, the memory system controller 115 may be unable to correctly read the data. It should be understood that such threshold ranges are examples, and that any threshold range between the write temperature and the read temperature of the data may cause the memory system 110 to experience cross-temperature exposure.

In some cases, the memory system controller 115 (e.g., mNAND device) may include a firmware algorithm to mitigate the effects of cross-temperature exposure. For example, if the data has experienced cross-temperature exposure and is unable to be read (e.g., the data is corrupted), the memory system controller 115 (e.g., according to the firmware algorithm stored in local memory 120) may perform various read operations according to different read settings (e.g., reference voltages, trim settings, or other parameters of read operations) until the data is read correctly. Such read settings may be stored as a list in one or more pages 175 of the memory devices 130 and loaded into the local memory 120 of the memory system controller 115 in response to the memory system controller 115 being unable to read the data correctly. Further, each read setting may be associated with a range between a write temperature and a read temperature.

However, applying various read operations with different read settings may further increase latency at the memory system 110 during read operations at least partly because the memory system controller 115 may perform multiple read operations with multiple read settings, resulting in relatively slower read performance. Accordingly, during the boot sequence of the system 100, the memory system 110 may experience cross-temperature exposure during read operations of the boot sequence data and attempt to perform multiple read operations, each with a respective read setting, in order to correctly read the boot sequence data, which may result in an increased latency during the boot sequence, among other various challenges.

In accordance with the techniques described herein, the memory system 110 may maintain information, such as a table 185, in one or more pages 175 of the memory devices 130 (e.g., non-volatile memory), where the information (e.g., table 185) provides an association between LBAs 190 (e.g., LBA 190-a, LBA 190-b, LBA 190-c, and LBA 190-n), each corresponding to a respective physical address of the memory devices 130 that store the boot sequence data, and write temperatures 195 (e.g., a write temperature 195-a, a write temperature 195-b, a write temperature 195-c, and a write temperature 195-n) of the boot sequence data at each LBA 190. Each LBA 190 (e.g., list of LBAs for system boot up data) may be a single LBA or a range of LBAs. Similarly, each write temperature 195 (e.g., boot_data_write_operation_temperature) may be a single temperature or temperature range of the memory system 110 during the write operations of the portions of the boot sequence data.

As an illustrative example, the LBA 190-a may be a single LBA corresponding to a single physical address at which a first portion of the boot sequence data is stored, while the write temperature 195-a may be a temperature range (e.g., 25 degrees Celsius to 30 degrees Celsius) experienced by the memory system 110 during the write operation of the first portion of the boot sequence data. As another illustrative example, the LBA 190-b may be a range of LBAs (e.g., LBA X through LBA Y), which may correspond to a range of physical addresses at which a second portion of the boot sequence data is stored, while the write temperature 195-b may be a single temperature (e.g., 28 degrees Celsius) experienced by the memory system 110 during the write operation of the second portion of the boot sequence data. In some examples, the memory system 110 may maintain a respective table 185 for each application operated by the host system 105. In some other examples, the memory system 110 may maintain a single table 185 that stores an association between the LBAs 190 and the write temperatures 195 for the boot sequence data of all applications operated at the host system 105.

Accordingly, during the boot sequence of the system 100, the memory system controller 115 may identify an operating temperature, such as a current operating temperature, of the memory system 110. For example, the memory system 110 may include a thermal sensor, where during the boot sequence of the memory system 110 (e.g., NAND initialization phase), the memory system controller 115 may obtain (e.g., read) the operating temperature of the memory system 110 from the thermal sensor. In such examples, because the memory system controller 115 reads the output of the thermal sensor during the NAND initialization phase, the memory system controller 115 may obtain the operating temperature of the memory system 110 prior to the host system 105 requesting the boot sequence data. That is, in some examples, the memory system controller 115 obtains the current operating temperature prior to receiving one or more read commands requesting the boot sequence data from the host system 105 (e.g., there is a thermal sensor that can be read prior to system boot up). In some other examples, the memory system controller 115 may obtain the operating temperature of the memory system 110 at the same time as receiving the one or more read commands requesting the boot sequence data from the host system 105.

Based on, or in conjunction with, obtaining the operating temperature of the memory system 110, the memory system controller 115 may load the table 185 from the one or more pages 175 of the memory devices 130 (e.g., non-volatile memory) to the local memory 120 (e.g., volatile memory, RAM). As such, the memory system controller 115 may identify a respective write temperature 195 for each portion of the boot sequence data from the table 185. Based on identifying the operating temperature and the respective write temperatures 195 for each portion of the boot sequence data, the memory system controller 115 may select a respective read setting (e.g., a reference voltage, trim setting) used to read each portion of the boot sequence data according to a difference between the operating temperature of the memory system 110 and the respective write temperatures 195. In this way, according to the selected read settings, the memory system controller 115 may perform a single read operation, for example, at each physical address associated with the LBAs 190 listed in the table 185 to obtain the boot sequence data, thereby reducing latency during the boot sequence due to cross-temperature exposure and avoiding system boot up timeouts, among others advantages.

Figure 2:
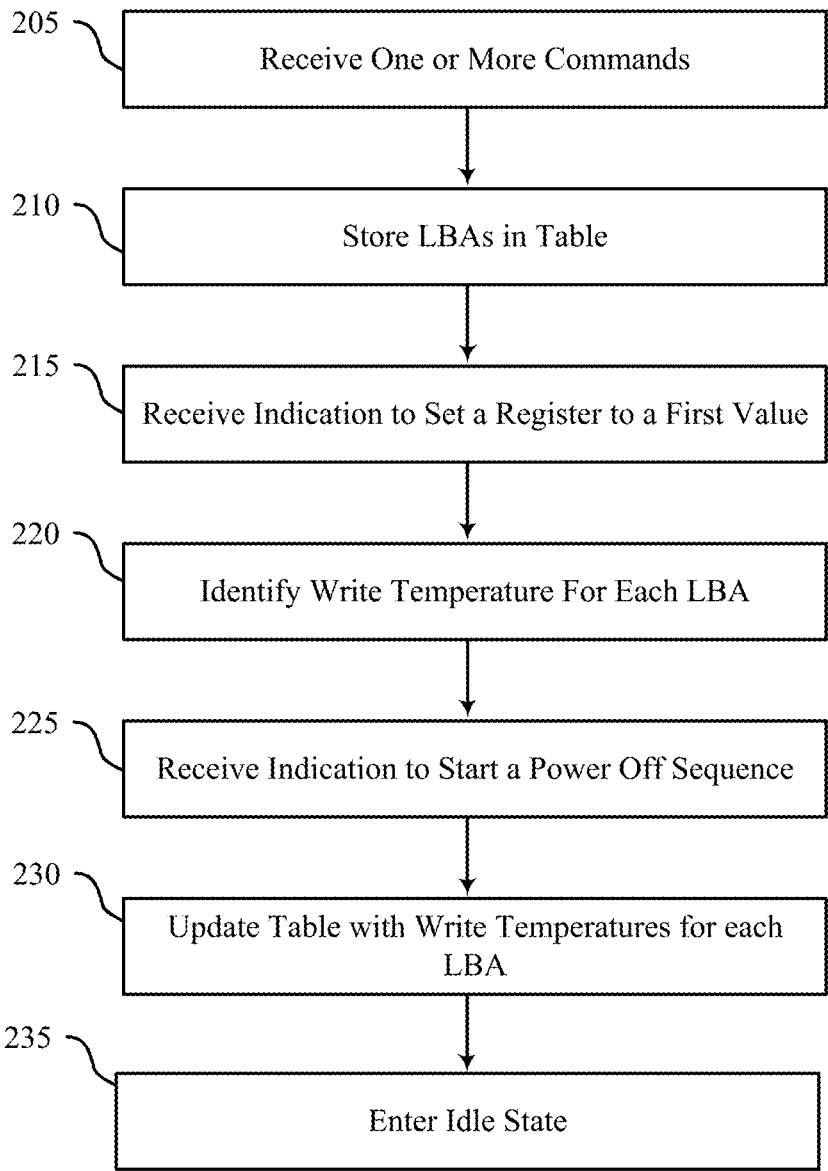
FIG. 2 shows an example of a process flow that supports techniques for managing cross-temperature exposure in memory systems in accordance with examples as disclosed herein.

FIG. 2 shows an example of a process flow 200 that supports techniques for managing cross-temperature exposure in memory systems in accordance with examples as disclosed herein. Aspects of the process flow 200 may be implemented by aspects of the system 100, as described herein with reference to FIG. 1. For example, one or more operations of the process flow 200 may be performed by the memory system controller 115, the local controllers 135, or the host system controller 106. The techniques described in the context of the process flow 200 may enable the memory system controller 115 to generate and update the table 185.

At 205, the memory system controller 115 may receive, from the host system controller 106, one or more commands (e.g., vendor command) each indicating a respective LBA range at which a portion of boot sequence data is to be stored. For example, the host system 105 may provide the list of LBAs 190 read during the boot sequence of the system 100 via the one or more commands. Each of the one or more commands may have one or more (e.g., two) arguments (e.g., portions), where a first argument (e.g., first portion) may be a starting LBA 190 (e.g., LBA_Start) and/or a second argument (e.g., second portion) may be a quantity of LBAs 190 from the starting LBA 190 (e.g., LBA_Range). In some examples, one argument may indicate a starting LBA 190 and/or a quantity of LBAs 190 from a starting LBA 190. As an illustrative example, the memory system controller 115 may receive a first command indicating a starting LBA 190 of X and a quantity of LBAs 190 of Y. Accordingly, the memory system controller 115 may have an indication that a first portion of the boot sequence data is stored at physical addresses associated with LBA X through LBA X+Y.

In some examples, the memory system controller 115 may receive the one or more commands at 205 in response to a system image being written to the memory system 110. For example, when writing the system image, the host system 105 may transmit the one or more commands (e.g., transmit the vendor command several times), such that the host system 105 may provide the memory system controller 115 the entire list of LBAs 190 read during the boot sequence of the system 100. In such examples, the entire list of LBAs 190 provided by the host system 105 may be fixed during system design (e.g., the boot sequence data is not moved to other physical addresses of the memory devices 130), such that the host system 105 transmits the sequence of commands at the beginning of an application lifetime.

In some other examples, the memory system controller 115 may receive, from the host system 105, one or more second commands indicating updated LBA ranges at which the boot sequence data stored, where the host system 105 may provide the updated LBA ranges in response to a maintenance procedure at the memory system 110. For example, during a maintenance procedure (e.g., system maintenance), the boot sequence data may be stored at physical addresses of the memory devices 130 that are different from the physical addresses originally used to store the boot sequence data. Accordingly, the host system 105 may identify such changes and transmit one or more second commands indicating the updated list of LBAs 190 that are to be read during the boot sequence of the system 100.

At 210, the memory system controller 115 may store the list of LBAs 190 provided at 205 in the table 185. That is, the memory system controller 115 may fill the table 185 with the list of LBAs 190 for use during the boot sequence of the system 100. For example, the memory system controller 115 may load the table 185 from non-volatile memory to volatile memory and store the each LBA, or LBA range, indicated by the one or more commands in a respective entry of the table 185.

Figure 3:
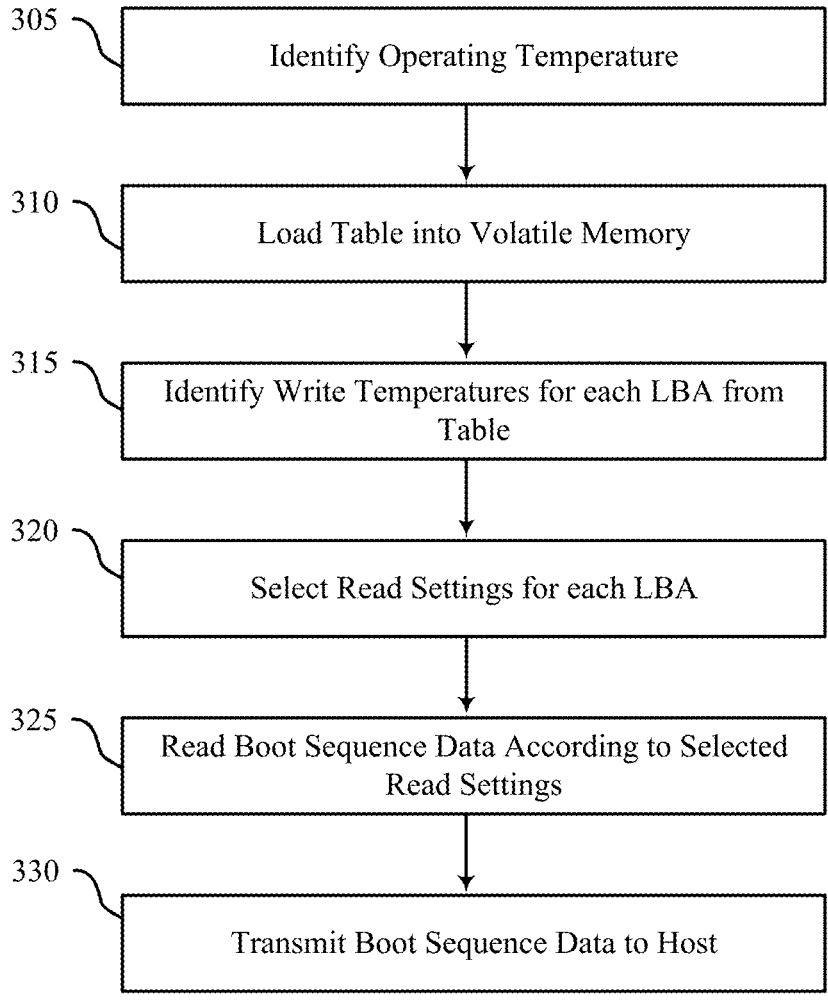
FIG. 3 shows an example of a process flow that supports techniques for managing cross-temperature exposure in memory systems in accordance with examples as disclosed herein.

At 215, the memory system controller may receive, from the host system controller 106, an indication to enable a cross-temperature management procedure at the memory system 110, where the cross-temperature management procedure may be further described herein with reference to FIG. 3. For example, the memory system controller 115 may maintain a register (e.g., mode register, information register, or the like) that indicates whether the cross-temperature management procedure is enabled during the boot sequence of the system 100. Accordingly, at 215, the memory system controller 115 may receive an indication from the host system controller 106 to set the register to a first value (e.g., a logical '1') or a second value (e.g., a default value, or logical '0').

If the register is set to the second value (e.g., a logical '0'), the memory system controller 115 may not perform the cross-temperature management procedure during the boot sequence of the system 100, and instead read the boot sequence data without utilizing the table 185 (e.g., during the boot sequence, if the boot sequence data experiences cross-temperature exposure, the memory system controller 115 may apply several read options to read the boot sequence data). Alternatively, if the host system 105 sets the value of the register to the first value (e.g., a logical '1'), the memory system controller 115 may perform the cross-temperature management procedure utilizing the table 185, as further described herein with reference to FIG. 3. In some examples, the value of the register may enable or disable the cross-temperature management procedure, as described herein with reference to FIG. 3 (e.g., '1' equals enabled, '0' equals disabled). Table 1 shows an example of the register.

| Register X | Value |
|---|---|
| Cross-Temperature Management Procedure to Perform During Boot Sequence | '0': Perform Multiple Read Operations to Read Each Portion of the Boot Sequence Data. <br> '1': Utilize Table 185 to Perform a Single Read operation to Read Each Portion of the Boot Sequence Data. |

By enabling or disabling the cross-temperature management procedure using the register, the host system 105 may have the flexibility to determine whether to allocate time in different operations of the system lifetime, in order to minimize the impact of cross-temperature exposure during the boot sequence. That is, because the cross-temperature management procedure may have some additional operations during the lifetime (e.g., on state) of the system 100, the host system 105 may determine whether such operations are beneficial in minimizing the effects of cross-temperature exposure during the boot sequence of the system 100.

At 220, the memory system controller 115 may identify the write temperatures 195 associated with list of LBAs 190 during the respective write operations to write the boot sequence data to the physical addresses associated with the list of LBAs 190 provided at 205. For example, during operations at the memory system 110, the memory system controller 115 may receive one or more write commands to write the boot sequence data to respective physical addresses of one or more memory devices 130, may perform one or more maintenance operations (e.g., garbage collection or refresh algorithms) and write the boot sequence data to respective physical addresses, or both. Accordingly, during such write operations, the memory system controller 115 may identify a write temperature 195 (e.g., an operating temperature of the memory device 130 at which the portion of the boot sequence data is being written) and store the write temperatures 195 in the local memory 120 (e.g., volatile memory). In this way, the memory system controller 115 may keep track of the respective write temperatures 195 of the boot sequence data during operations (e.g., system lifetime) at the memory system 110.

At 225, the memory system controller 115 may receive an indication to start a power off sequence (e.g., enter an off state or idle state). For example, prior to powering off, the host system 105 may transmit to the memory system 110 a power off notification command to notify the memory system 110 when the system 100, the memory system 110, or both are to be powered off. Accordingly, during a duration between receiving the power off notification and powering off, the memory system controller 115 may perform internal operations to one or more memory devices 130. In some examples, if the register is set to the first value (e.g., a logical value of '1') at 215, the host system 105 may transmit the power off notification to the memory system controller 115, where the memory system controller 115 may perform the operation 230 during the duration between receiving the power off notification and powering off (e.g., power off notification latency).

For example, at 230, in response to receiving the indication to start the power off sequence, the memory system controller 115 may load the table 185 from non-volatile memory to the local memory 120 and check the list of LBAs 190 in the table 185. Based on loading the table 185 into the local memory 120, the memory system controller 115 may update the table 185 to include the write temperatures 195, identified at 220, for each LBA 190. That is, per LBA 190 in the table 185, the memory system controller 115 may store a respective write temperature 195 of the boot sequence data stored at an associated physical address. In some examples, the operation 230 may be performed each time an indication to start the power off sequence is received. Alternatively, if, during the operation of the memory system 110, the boot sequence data was not written, the memory system controller 115 may skip performing the operation 230. That is, the memory system controller 115 may update the table 185 with the write temperatures 195 based on whether the boot sequence data was written during the operation of the memory system 110. At 235, the memory system 110, the system 100, or both may enter the idle state (e.g., off state or hibernate state) in response to receiving the power off notification at 225.

FIG. 3 shows an example of a process flow 300 that supports techniques for managing cross-temperature exposure in memory systems in accordance with examples as disclosed herein. Aspects of the process flow 300 may be implemented by the system 100, as described herein with reference to FIG. 1. For example, the operations of the process flow 300 may be implemented by the host system controller 106, the memory system controller 115, the local controller 135, or a combination of such devices. The process flow 300 may be referred to as the cross-temperature management procedure and be performed during a NAND initialization phase of a boot sequence of the system 100 (e.g., at each powering on the system 100).

At 305, during the boot sequence of the system 100, the memory system controller 115 may identify an operating temperature of the memory system 110, of the memory devices 130, or both. For example, the memory system controller 115 may obtain the current operating temperature (e.g., Temp_Boot) of the memory system 110 from a thermal sensor embedded at the memory system 110 during the NAND initialization phase (e.g., preparation phase of the memory devices 130) of the boot sequence of the system 100.

At 310, the memory system controller 115 may load the table 185 from one or more pages 175 of the memory devices 130 (e.g., non-volatile memory) to local memory 120 (e.g., volatile memory or RAM) of the memory system controller 115. For example, prior to loading the table 185 into the local memory 120, the memory system controller 115 may identify (e.g., check) the value of a register (e.g., the register as described herein with reference to FIG. 2). Accordingly, if the value of the register is set to a first value (e.g., a logical '1'), the memory system controller 115 may have an indication that the cross-temperature management procedure is enabled and load the table 185 from the one or more pages 175 of the memory devices 130 to the local memory 120 of the memory system controller 115.

In some examples, the memory system controller 115 may load a portion of the table 185 into the local memory 120, perform the operations 315-330, and return the portion of the table 185 to the respective pages 175 of the memory devices 130. Accordingly, the memory system controller 115 may load a second portion of the table into the local memory 120, perform the operations 315-330, and return the portion of the table 185 to the respective pages 175 of the memory devices 130. Alternatively, the memory system controller 115 may load the entire table 185 into the local memory 120 and perform the operations 315-330.

In some examples, if the memory system controller 115 maintains respective tables 185 for each application at the host system 105, the memory system controller 115 may load each respective table 185 into the local memory 120 at the same time, perform the operations 315-330 using each respective table 185, and return each respective table 185 to respective pages 175 of the memory devices 130. Alternatively, in such examples, the memory system controller 115 may load a first table 185 of the respective tables 185 into the local memory 120, perform the operations 315-330 using the first table 185, and return the first table 185 to the respective pages 175 of the memory devices 130. The memory system controller 115 may repeat such operations for each table 185.

At 315, based on loading the table 185 into the local memory 120, the memory system controller 115 may identify, for each LBA 190 associated with the boot sequence data, a respective write temperature 195 (e.g., boot_data_write_operation_temperature). As an illustrative example, the memory system controller 115 may identify the write temperature 195-$a$ of a first portion of the boot sequence data written to a first physical address associated with the LBA 190-$a$, identify the write temperature 195-$b$ of a second portion of the boot sequence data written to a second physical address associated with LBA 190-$b$, identify the write temperature 195-$c$ of a third portion of the boot sequence data written to a third physical address associated with the LBA 190-$c$, and identify the write temperature 195-$n$ of an $N^{th}$ portion of the boot sequence data written to an $N^{th}$ physical address associated with LBA 190-$n$. In this way, using the table 185, the memory system controller 115 may identify the respective write temperatures 195 associated with the boot sequence data stored at respective LBAs 190.

At 320, the memory system controller 115 may select a respective read setting from a list of read settings (e.g., from multiple read settings) based on a difference (e.g., Delta_Temp) between the operating temperature of the memory system 110 and the respective write temperatures 195 (e.g., based on Delta_Temp, where Delta_Temp=Temp_Boot-boot_data_write_operation_temperature). That is, the memory system controller 115 may compare the operating temperature of the memory system 110 to each of the write temperatures 195 to obtain the difference.

For example, the memory system controller 115 may load, from one or more pages 175 of the memory devices 130 (e.g., non-volatile memory), a list of available read settings to the local memory 120 (e.g., volatile memory). Each read setting of the list may be a different reference voltage or trim setting and be associated with a respective temperature range (e.g., cross-temperature range). Accordingly, the memory system controller 115 may select a respective read setting from multiple read settings to read each portion of the boot sequence data, where the temperature ranges associated with the respective read settings correspond to the respective differences between the operating temperature of the memory system 110 and the respective write temperatures 195.

In some illustrative examples, the memory system controller 115 may identify the operating temperature to be a first temperature, such as 25 degrees Celsius, and identify the write temperature 195-a, associated with the boot sequence data stored at the physical address associated with the LBA 190-a, to be a second temperature that is different than the first temperature, such as 50 degrees Celsius. The memory system controller 115 may determine that the difference between the operating temperature of the memory system 110 and the write temperature 195-a to be a value, such as −25 degrees Celsius (e.g., 25−50=−25 or an absolute value of 25). Accordingly, the memory system controller 115 may identify a read setting from the list of read settings that has a temperature range that includes and/or encompasses the value (such as −25 degrees Celsius or 25 degrees Celsius absolute value, is between −20 degrees Celsius and −30 degrees Celsius, is between 20 degrees Celsius and 30 degrees Celsius absolute value). In this way, the memory system controller 115 may identify the read setting to use to read the boot sequence data associated with the LBA 190-a.

In some other illustrative examples, the memory system controller 115 may identify the operating temperature to be 100 degree Celsius and identify the write temperature 195-a, associated with the boot sequence data stored at the physical address associated with the LBA 190-a, to be 25 degrees Celsius. Accordingly, the memory system controller 115 may determine that the difference between the operating temperature of the memory system 110 and the write temperature 195-a to be 75 degrees Celsius (e.g., 100−25=75). Accordingly, the memory system controller 115 may identify a read setting from the list of read settings that has a temperature range of 75 degrees Celsius. In this way, the memory system controller 115 may identify the read setting to use to read the boot sequence data associated with the LBA 190-a.

At 325, the memory system controller 115 may utilize the respective read settings, selected at 320, to read the boot sequence data from physical addresses associated with the LBAs 190. That is, the memory system controller 115 may apply the selected read settings to obtain the boot sequence data during the boot sequence of the system 100. For example, the memory system controller 115 may read a portion of the boot sequence data associated with the LBA 190-a using a first read setting selected at 320 and read a portion of the boot sequence data associated with the LBA 190-b using a second read setting selected at 320 (e.g., the read settings utilized to read portions of boot sequence data associated with different LBAs 190 may be different). In this way, the memory system controller 115 may use the respective read settings to correctly read the boot sequence data in the case of cross-temperature exposure, while also minimizing the impact on read performance. That is, the memory system controller 115 may use the respective read settings to perform a single read operation when reading the boot sequence data from the LBAs 190, thereby reducing latency during the boot sequence of the system 100.

At 330, the memory system controller 115 may transmit the boot sequence data to the host system 105 in response to reading the boot sequence data according to the respective read settings.

Figure 4:
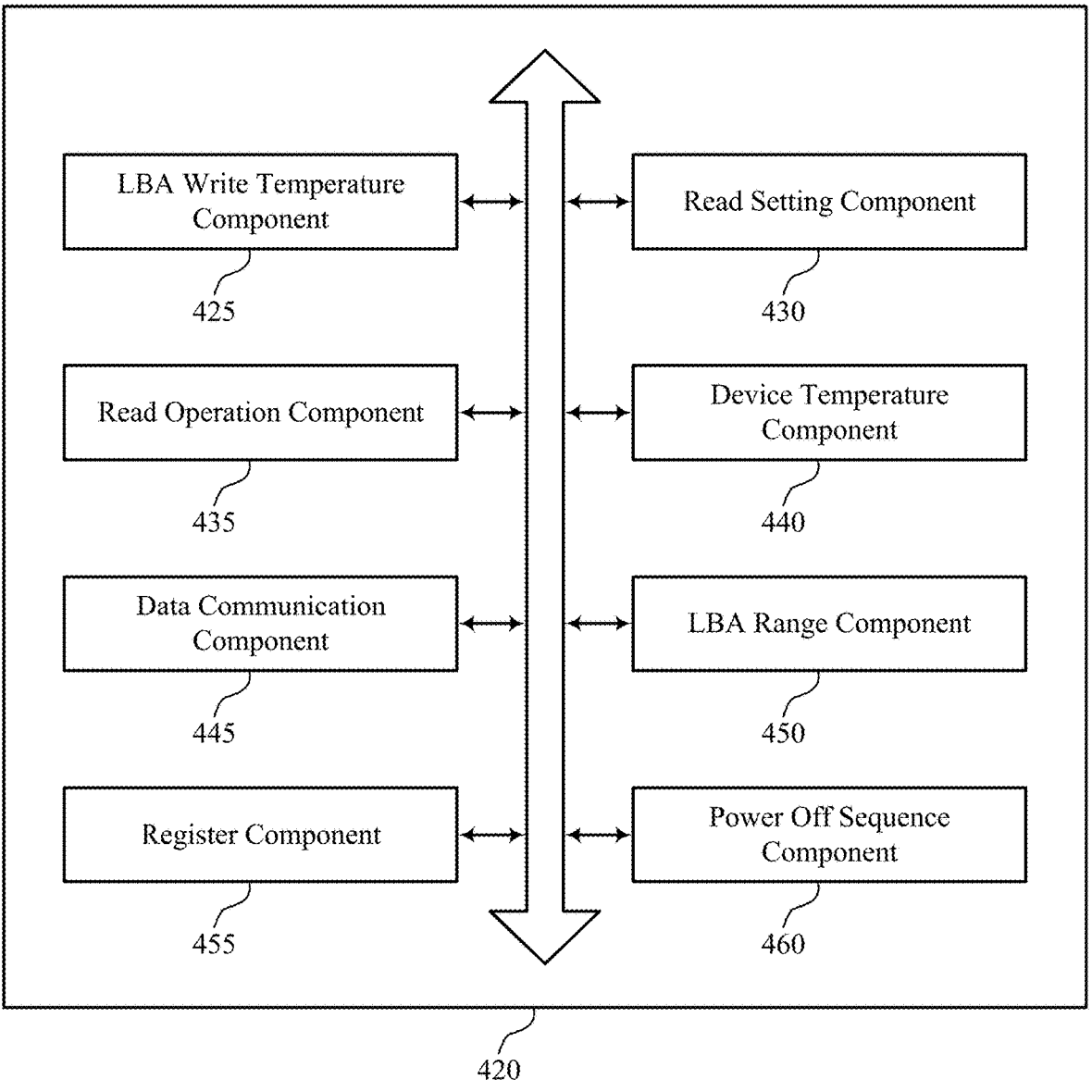
FIG. 4 shows a block diagram of a memory system that supports techniques for managing cross-temperature exposure in memory systems in accordance with examples as disclosed herein.

FIG. 4 shows a block diagram 400 of a memory system 420 that supports techniques for managing cross-temperature exposure in memory systems in accordance with examples as disclosed herein. The memory system 420 may be an example of aspects of a memory system as described with reference to FIGS. 1 through 3. The memory system 420, or various components thereof, may be an example of means for performing various aspects of techniques for managing cross-temperature exposure in memory systems as described herein. For example, the memory system 420 may include an LBA write temperature component 425, a read setting component 430, a read operation component 435, a device temperature component 440, a data communication component 445, an LBA range component 450, a register component 455, a power off sequence component 460, or any combination thereof. Each of these components, or components of subcomponents thereof (e.g., one or more processors, one or more memories), may communicate, directly or indirectly, with one another (e.g., via one or more buses).

The LBA write temperature component 425 may be configured as or otherwise support a means for identifying, during a boot sequence of a memory system, a temperature associated with a write operation at a LBA of a first memory device of the memory system, the LBA being associated with a physical address of the first memory device that stores a portion of boot sequence data. The read setting component 430 may be configured as or otherwise support a means for selecting a read setting from a plurality of read settings based on a difference between an operating temperature of the first memory device during the boot sequence of the memory system and the temperature associated with the write operation at the LBA of the first memory device. The read operation component 435 may be configured as or otherwise support a means for reading the portion of the boot sequence data from the physical address associated with the LBA according to the read setting.

In some examples, to support identifying the temperature associated with the write operation at the LBA, the LBA write temperature component 425 may be configured as or otherwise support a means for identifying the temperature from a table including a plurality of LBAs and a plurality of temperatures, each of the plurality of temperatures being associated with a respective write operation at each LBA of the plurality of LBAs.

In some examples, the LBA write temperature component 425 may be configured as or otherwise support a means for loading the table from non-volatile memory of the memory system to volatile memory of the memory system based on a start of the boot sequence, where identifying the temperature from the table is based on loading the table into the volatile memory.

In some examples, the LBA range component 450 may be configured as or otherwise support a means for receiving, from a host system, one or more commands each indicating a LBA range at which a respective portion of the boot sequence data is stored, where the plurality of LBAs included in the table are based on the LBA ranges received via the one or more commands.

In some examples, a first portion of the one or more commands includes a starting LBA, and a second portion of the one or more commands includes a quantity of LBAs from the starting LBA.

In some examples, the LBA write temperature component 425 may be configured as or otherwise support a means for identifying, during the respective write operations at each LBA of the plurality of LBAs, each of the plurality of temperatures. In some examples, the LBA write temperature component 425 may be configured as or otherwise support a means for storing each of the plurality of temperatures to respective entries in the table based on identifying.

In some examples, the power off sequence component 460 may be configured as or otherwise support a means for receiving, from a host system, an indication to start a power off sequence, where storing each of the plurality of temperatures is based on the indication to start the power off sequence.

In some examples, the device temperature component 440 may be configured as or otherwise support a means for identifying, during the boot sequence, the operating temperature of the first memory device, where selecting the read setting is based on identifying the operating temperature of the first memory device.

In some examples, the data communication component 445 may be configured as or otherwise support a means for transmitting the portion of the boot sequence data to a host system based on reading the portion of the boot sequence data from the physical address according to the read setting.

In some examples, identifying the temperature associated with the write operation of the LBA at the first memory device is based on a register at the memory system being set to a first value.

In some examples, the register component 455 may be configured as or otherwise support a means for receiving, from a host system, an indication to set the register to the first value.

In some examples, the LBA write temperature component 425 may be configured as or otherwise support a means for identifying, during the boot sequence, a second temperature associated with a second write operation at a second LBA of the first memory device, the second LBA being associated with a second physical address that stores a second portion of the boot sequence data. In some examples, the read setting component 430 may be configured as or otherwise support a means for selecting a second read setting from the plurality of read settings based on a difference between the operating temperature and the second temperature. In some examples, the read operation component 435 may be configured as or otherwise support a means for reading the second portion of the boot sequence data from the second physical address according to the second read setting.

In some examples, the read setting includes a reference voltage to apply to one or more memory cells associated with the physical address.

In some examples, the plurality of read settings are stored in non-volatile memory of the memory system.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
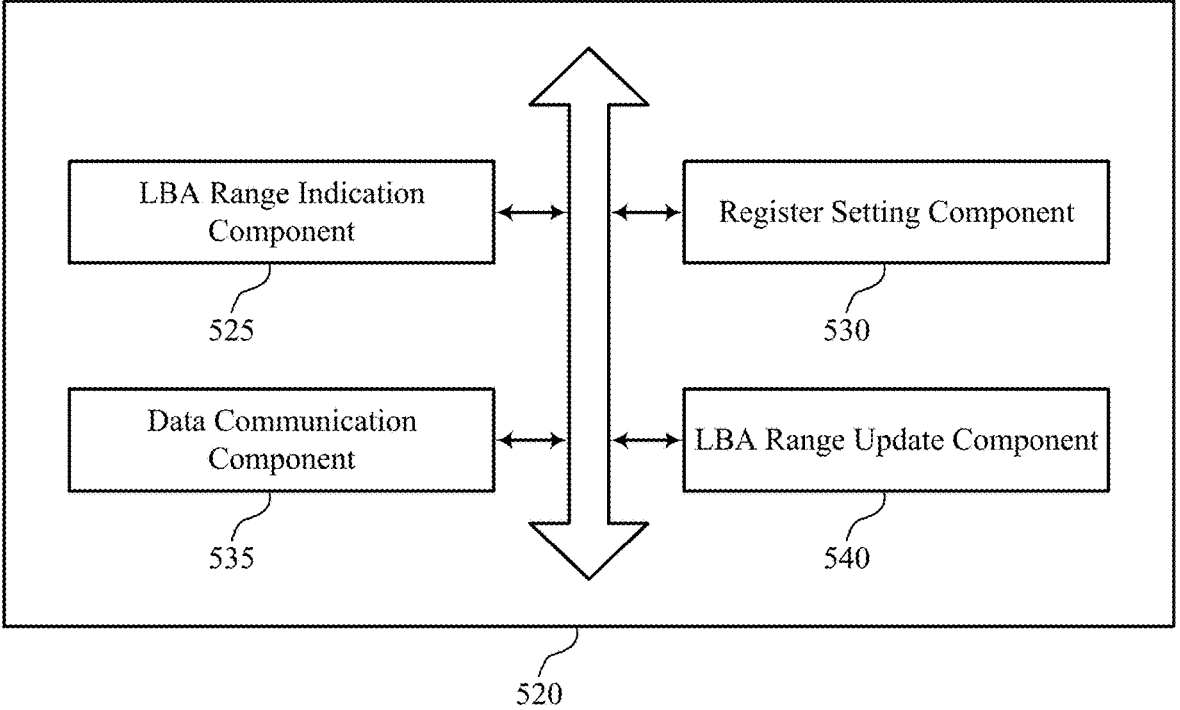
FIG. 5 shows a block diagram of a host system that supports techniques for managing cross-temperature exposure in memory systems in accordance with examples as disclosed herein.

FIG. 5 shows a block diagram 500 of a host system 520 that supports techniques for managing cross-temperature exposure in memory systems in accordance with examples as disclosed herein. The host system 520 may be an example of aspects of a host system as described with reference to FIGS. 1 through 3. The host system 520, or various components thereof, may be an example of means for performing various aspects of techniques for managing cross-temperature exposure in memory systems as described herein. For example, the host system 520 may include an LBA range indication component 525, a register setting component 530, a data communication component 535, an LBA range update component 540, or any combination thereof. Each of these components, or components of subcomponents thereof (e.g., one or more processors, one or more memories), may communicate, directly or indirectly, with one another (e.g., via one or more buses).

The LBA range indication component 525 may be configured as or otherwise support a means for transmitting, to a memory system, one or more commands each indicating a LBA range at which a portion of boot sequence data is stored. The register setting component 530 may be configured as or otherwise support a means for transmitting, to the memory system, an indication to enable a cross-temperature management procedure at the memory system. The data communication component 535 may be configured as or otherwise support a means for receiving, during a boot sequence of the memory system, the boot sequence data from the memory system based on transmitting the indication to enable the cross-temperature management procedure.

In some examples, to support transmitting the indication to enable the cross-temperature management procedure, the register setting component 530 may be configured as or otherwise support a means for transmitting an indication for the memory system to set a register to a first value.

In some examples, the LBA range update component 540 may be configured as or otherwise support a means for transmitting, to the memory system and based on a maintenance procedure at the memory system, one or more second commands indicating updated LBA ranges at which the boot sequence data is stored.

In some examples, a first portion of the one or more commands includes a starting LBA, and a second portion of the one or more commands includes a quantity of LBAs from the starting LBA.

In some examples, the described functionality of the host system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the host system 520, or various components thereof, may be implemented at least in part by instructions (e.g., stored in memory, non-transitory computer-readable medium) executable by such at least one processor.

FIG. 6 shows a flowchart illustrating a method 600 that supports techniques for managing cross-temperature exposure in memory systems in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include identifying, during a boot sequence of a memory system, a temperature associated with a write operation at LBA of a first memory device of the memory system, the LBA being associated with a physical address of the first memory device that stores a portion of boot sequence data. The operations of 605 may be performed in accordance with examples as disclosed herein. For example, the memory system controller 115 (e.g., as described herein with reference to FIG. 1) may include an LBA write temperature component 425 (e.g., as described herein with reference to FIG. 4) that identifies the temperature associated with the write operation at an LBA (e.g., as described herein, including with reference to operations at 315 of FIG. 3).

At 610, the method may include selecting a read setting from a plurality of read settings based on a difference between an operating temperature of the first memory device during the boot sequence of the memory system and the temperature associated with the write operation at the LBA of the first memory device. The operations of 605 may be performed in accordance with examples as disclosed herein. For example, the memory system controller 115 (e.g., as described herein with reference to FIG. 1) may include a read setting component 430 (e.g., as described herein with reference to FIG. 4) that selects the read setting (e.g., as described herein, including with reference to operations at 320 of FIG. 3).

At 615, the method may include reading the portion of the boot sequence data from the physical address associated with the LBA according to the read setting. The operations of 615 may be performed in accordance with examples as disclosed herein. For example, the memory system controller (e.g., as described herein with reference to FIG. 1) may include a read operation component 435 (e.g., as described with reference to FIG. 4) that performs the read operation read the portion of the boot sequence data according to the selected read setting (e.g., as described herein, including with reference to operations at 325 of FIG. 3).

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying, during a boot sequence of a memory system, a temperature associated with a write operation at a LBA of a first memory device of the memory system, the LBA being associated with a physical address of the first memory device that stores a portion of boot sequence data; selecting a read setting from a plurality of read settings based on a difference between an operating temperature of the first memory device during the boot sequence of the memory system and the temperature associated with the write operation at the LBA of the first memory device; and reading the portion of the boot sequence data from the physical address associated with the LBA according to the read setting.

Aspect 2: The method, apparatus, or non-transitory computer-readable medium of aspect 1, where identifying the temperature associated with the write operation at the LBA includes operations, features, circuitry, logic, means, or instructions, or any combination thereof for identifying the temperature from a table including a plurality of LBAs and a plurality of temperatures, each of the plurality of temperatures being associated with a respective write operation at each LBA of the plurality of LBAs.

Aspect 3: The method, apparatus, or non-transitory computer-readable medium of aspect 2, further including operations, features, circuitry, logic, means, or instructions, or any combination thereof for loading the table from non-volatile memory of the memory system to volatile memory of the memory system based on a start of the boot sequence, where identifying the temperature from the table is based on loading the table into the volatile memory.

Aspect 4: The method, apparatus, or non-transitory computer-readable medium of any of aspects 2 through 3, further including operations, features, circuitry, logic, means, or instructions, or any combination thereof for receiving, from a host system, one or more commands each indicating a LBA range at which a respective portion of the boot sequence data is stored, where the plurality of LBAs included in the table are based on the LBA ranges received via the one or more commands.

Aspect 5: The method, apparatus, or non-transitory computer-readable medium of aspect 4, where a first portion of the one or more commands includes a starting LBA, and a second portion of the one or more commands includes a quantity of LBAs from the starting LBA.

Aspect 6: The method, apparatus, or non-transitory computer-readable medium of any of aspects 2 through 5, further including operations, features, circuitry, logic, means, or instructions, or any combination thereof for identifying, during the respective write operations at each LBA of the plurality of LBAs, each of the plurality of temperatures and storing each of the plurality of temperatures to respective entries in the table based on identifying.

Aspect 7: The method, apparatus, or non-transitory computer-readable medium of aspect 6, further including operations, features, circuitry, logic, means, or instructions, or any combination thereof for receiving, from a host system, an indication to start a power off sequence, where storing each of the plurality of temperatures is based on the indication to start the power off sequence.

Aspect 8: The method, apparatus, or non-transitory computer-readable medium of any of aspects 1 through 7, further including operations, features, circuitry, logic, means, or instructions, or any combination thereof for identifying, during the boot sequence, the operating temperature of the first memory device, where selecting the read setting is based on identifying the operating temperature of the first memory device.

Aspect 9: The method, apparatus, or non-transitory computer-readable medium of any of aspects 1 through 8, further including operations, features, circuitry, logic, means, or instructions, or any combination thereof for transmitting the portion of the boot sequence data to a host system based on reading the portion of the boot sequence data from the physical address according to the read setting.

Aspect 10: The method, apparatus, or non-transitory computer-readable medium of any of aspects 1 through 9, where identifying the temperature associated with the write operation of the LBA at the first memory device is based on a register at the memory system being set to a first value.

Aspect 11: The method, apparatus, or non-transitory computer-readable medium of aspect 10, further including operations, features, circuitry, logic, means, or instructions, or any combination thereof for receiving, from a host system, an indication to set the register to the first value.

Aspect 12: The method, apparatus, or non-transitory computer-readable medium of any of aspects 1 through 11, further including operations, features, circuitry, logic, means, or instructions, or any combination thereof for identifying, during the boot sequence, a second temperature associated with a second write operation at a second LBA of the first memory device, the second LBA being associated with a second physical address that stores a second portion of the boot sequence data; selecting a second read setting from the plurality of read settings based on a difference between the operating temperature and the second temperature; and reading the second portion of the boot sequence data from the second physical address according to the second read setting.

Aspect 13: The method, apparatus, or non-transitory computer-readable medium of any of aspects 1 through 12, where the read setting includes a reference voltage to apply to one or more memory cells associated with the physical address.

Aspect 14: The method, apparatus, or non-transitory computer-readable medium of any of aspects 1 through 13, where the plurality of read settings are stored in non-volatile memory of the memory system.

FIG. 7 shows a flowchart illustrating a method 700 that supports techniques for managing cross-temperature exposure in memory systems in accordance with examples as disclosed herein. The operations of method 700 may be implemented by a host system or its components as described herein. For example, the operations of method 700 may be performed by a host system as described with reference to FIGS. 1 through 3 and 5. In some examples, a host system may execute a set of instructions to control the functional elements of the device to perform the described functions. Additionally, or alternatively, the host system may perform aspects of the described functions using special-purpose hardware.

At 705, the method may include transmitting, to a memory system, one or more commands each indicating a LBA range at which a portion of boot sequence data is stored. The operations of 705 may be performed in accordance with examples as disclosed herein. For example, the host system controller 106 (e.g., as described herein with reference to FIG. 1) may include an LBA range indication component 525 (e.g., as described with reference to FIG. 5) that transmits the one or more commands to the memory system (e.g., as described herein, including with reference to operations at 205 of FIG. 2).

At 710, the method may include transmitting, to the memory system, an indication to enable a cross-temperature management procedure at the memory system. The operations of 705 may be performed in accordance with examples as disclosed herein. For example, the host system controller 106 (e.g., as described herein with reference to FIG. 1) may include a register setting component 530 (e.g., as described with reference to FIG. 5) that transmits the indication to enable the cross-temperature management procedure (e.g., as described herein, including with reference to operations at 215 of FIG. 2).

At 715, the method may include receiving, during a boot sequence of the memory system, the boot sequence data from the memory system based on transmitting the indication to enable the cross-temperature management procedure. The operations of 715 may be performed in accordance with examples as disclosed herein. For example, the host system controller 106 (e.g., as described herein with reference to FIG. 1) may include a data communication component 535 (e.g., as described with reference to FIG. 5) that receives the boot sequence data from the memory system (e.g., as described herein, including with reference to operations at 330 of FIG. 3).

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for transmitting, to a memory system, one or more commands each indicating a LBA range at which a portion of boot sequence data is stored; transmitting, to the memory system, an indication to enable a cross-temperature management procedure at the memory system; and receiving, during a boot sequence of the memory system, the boot sequence data from the memory system based on transmitting the indication to enable the cross-temperature management procedure.

Aspect 16: The method, apparatus, or non-transitory computer-readable medium of aspect 15, where transmitting the indication to enable the cross-temperature management procedure includes operations, features, circuitry, logic, means, or instructions, or any combination thereof for transmitting an indication for the memory system to set a register to a first value.

Aspect 17: The method, apparatus, or non-transitory computer-readable medium of any of aspects 15 through 16, further including operations, features, circuitry, logic, means, or instructions, or any combination thereof for transmitting, to the memory system and based on a maintenance procedure at the memory system, one or more second commands indicating updated LBA ranges at which the boot sequence data is stored.

Aspect 18: The method, apparatus, or non-transitory computer-readable medium of any of aspects 15 through 17, where a first portion of the one or more commands includes a starting LBA, and a second portion of the one or more commands includes a quantity of LBAs from the starting LBA.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
      identify, during a boot sequence of the memory system, a first temperature of a first memory device of the one or more memory devices, the first temperature being obtained during a write operation at a logical block address (LBA) of the first memory device, the LBA corresponding to a physical address of the first memory device that stores a portion of boot sequence data;
      select a read setting from a plurality of read settings based on a difference between an operating temperature of the first memory device during the boot sequence of the memory system and the first temperature; and
      read the portion of the boot sequence data from the physical address corresponding to the LBA according to the read setting.

2. The memory system of claim 1, wherein, to identify the first temperature at the LBA, the processing circuitry is configured to cause the memory system to:
   identify the first temperature from a table comprising a plurality of LBAs and a plurality of temperatures, each of the plurality of temperatures being obtained during a respective write operation at each LBA of the plurality of LBAs.

3. The memory system of claim 2, wherein the processing circuitry is further configured to cause the memory system to:
   load the table from non-volatile memory of the memory system to volatile memory of the memory system based on a start of the boot sequence, wherein identifying the first temperature from the table is based on loading the table into the volatile memory.

4. The memory system of claim 2, wherein the processing circuitry is configured to cause the memory system to:
   receive, from a host system, one or more commands each indicating a LBA range at which a respective portion of the boot sequence data is stored, wherein the plurality of LBAs included in the table are based on the one or more commands.

5. The memory system of claim 4, wherein a first portion of the one or more commands comprises a starting LBA, and a second portion of the one or more commands comprises one or more LBAs from the starting LBA.

6. The memory system of claim 2, wherein the processing circuitry is configured to cause the memory system to:

identify, during the respective write operation at each LBA of the plurality of LBAs, each of the plurality of temperatures; and store each of the plurality of temperatures to respective entries in the table based on identifying.

7. The memory system of claim 6, wherein the processing circuitry is configured to cause the memory system to:

receive, from a host system, an indication to start a power off sequence, wherein storing each of the plurality of temperatures is based on the indication to start the power off sequence.

8. The memory system of claim 1, wherein the processing circuitry is configured to cause the memory system to:

identify, during the boot sequence, the operating temperature of the first memory device, wherein selecting the read setting is based on identifying the operating temperature of the first memory device.

9. The memory system of claim 1, wherein the processing circuitry is configured to cause the memory system to:

transmit the portion of the boot sequence data to a host system based on reading the portion of the boot sequence data from the physical address according to the read setting.

10. The memory system of claim 1, wherein identifying the first temperature is based on a register at the memory system being set to a first value.

11. The memory system of claim 10, wherein the processing circuitry is configured to cause the memory system to:

receive, from a host system, an indication to set the register to the first value.

12. The memory system of claim 1, wherein the processing circuitry is configured to cause the memory system to:

identify, during the boot sequence, a second temperature of the first memory device, the second temperature being obtained during a second write operation at a second LBA of the first memory device, the second LBA corresponding to a second physical address that stores a second portion of the boot sequence data;

select a second read setting from the plurality of read settings based on a difference between the operating temperature and the second temperature; and read the second portion of the boot sequence data from the second physical address according to the second read setting.

13. The memory system of claim 1, wherein the read setting comprises a reference voltage to apply to one or more memory cells corresponding to the physical address.

14. The memory system of claim 1, wherein the plurality of read settings are stored in non-volatile memory of the memory system.

15. A host system, comprising:

one or more interfaces comprising one or more signal paths for communications with one or more memory systems; and processing circuitry coupled with the one or more interfaces and configured to cause the host system to:

transmit, to a first memory system of the one or more memory systems, one or more commands each indicating a logical block address (LBA) range at which a portion of boot sequence data is stored;

transmit, to the first memory system, an indication to enable a cross-temperature management procedure at the first memory system; and receive, during a boot sequence of the first memory system, the portion of the boot sequence data from the first memory system based on transmitting the indication to enable the cross-temperature management procedure.

16. The host system of claim 15, wherein, to transmit the indication to enable the cross-temperature management procedure, the processing circuitry is configured to cause the host system to:

transmit an indication for the first memory system to set a register to a first value.

17. The host system of claim 15, wherein the processing circuitry is further configured to cause the host system to:

transmit, to the first memory system and based on a maintenance procedure at the first memory system, one or more second commands indicating updated LBA ranges at which the boot sequence data is stored.

18. The host system of claim 15, wherein a first portion of the one or more commands comprises a starting LBA, and a second portion of the one or more commands comprises one or more LBAs from the starting LBA.

19. A system, comprising:

a memory system comprising one or more controllers and one or more memory devices coupled with the one or more controllers; and a host system coupled with the memory system and comprising one or more controllers, the one or more controllers of the host system configured to cause the host system to:

transmit, to the memory system, one or more commands each indicating a respective logical block address (LBA) range at which a portion of boot sequence data is stored; and transmit, to the memory system, an indication to enable a cross-temperature management procedure at the memory system, the one or more controllers of the memory system being configured to cause the memory system to:

select a read setting from a plurality of read settings based on a difference between an operating temperature of a first memory device of the one or more memory devices and a first temperature of the first memory device, the first temperature being obtained during a write operation at a LBA of the first memory device; and read the portion of the boot sequence data from a physical address corresponding to the LBA according to the read setting.

20. The system of claim 19, wherein the one or more controllers of the memory system are configured to cause the memory system to:

identify, from a table comprising a plurality of LBAs and a plurality of temperatures, the first temperature, wherein each temperature of the plurality of temperatures is obtained during a respective write operation at each LBA of the plurality of LBAs, and wherein selecting the read setting is based on identifying the first temperature from the table.

21. The system of claim 19, wherein, to transmit the indication to enable the cross-temperature management procedure, the one or more controllers of the host system are configured to cause the host system to:

transmit an indication for the memory system to set a register to a first value, wherein selecting the read setting is based on the register being set to the first value.

22. The system of claim 19, wherein the one or more controllers of the memory system are configured to cause the memory system to:

identify, during a boot sequence of the memory system, the operating temperature of the first memory device, wherein selecting the read setting is based on identifying the operating temperature.

23. The system of claim 19, wherein a first portion of the one or more commands comprises a starting LBA, and a second portion of the one or more commands comprises one or more LBAs from the starting LBA.

* * * * *